United States Patent
Le

(10) Patent No.: US 12,442,758 B2
(45) Date of Patent: Oct. 14, 2025

(54) METHOD FOR ANALYSING A GAS USING AN OPTICAL SENSOR

(71) Applicant: ELICHENS, Grenoble (FR)

(72) Inventor: Thanh Trung Le, Grenoble (FR)

(73) Assignee: ELICHENS, Grenoble (FR)

( * ) Notice: Subject to any disclaimer, the term of this patent is extended or adjusted under 35 U.S.C. 154(b) by 438 days.

(21) Appl. No.: 17/633,048

(22) PCT Filed: Jul. 28, 2020

(86) PCT No.: PCT/EP2020/071251
§ 371 (c)(1),
(2) Date: Feb. 4, 2022

(87) PCT Pub. No.: WO2021/023576
PCT Pub. Date: Feb. 11, 2021

(65) Prior Publication Data
US 2022/0276154 A1    Sep. 1, 2022

(30) Foreign Application Priority Data
Aug. 6, 2019 (FR) ...................................... 1909028

(51) Int. Cl.
*G01N 21/31* (2006.01)
*G01N 33/00* (2006.01)

(52) U.S. Cl.
CPC ......... *G01N 21/31* (2013.01); *G01N 33/0006* (2013.01); *G01N 2201/127* (2013.01)

(58) Field of Classification Search
CPC ............... G01N 21/31; G01N 33/0006; G01N 2201/127
See application file for complete search history.

(56) References Cited

U.S. PATENT DOCUMENTS 4,297,577 A * 10/1981 Coe ..................... G01N 21/3504
250/343
5,026,992 A    6/1991 Wong
(Continued)

FOREIGN PATENT DOCUMENTS

DE    19925196 A1    12/2000
FR    3000548 B1    2/2017
(Continued)

OTHER PUBLICATIONS

International Search Report for International Application No. PCT/EP2020/071251, mailed Oct. 6, 2020, 6 pages with English Translation.
(Continued)

*Primary Examiner* — Dominic J Bologna
*Assistant Examiner* — Mohamed Doumbia
(74) *Attorney, Agent, or Firm* — TraskBritt

(57) ABSTRACT

Method for measuring an amount of a gas species—able to absorb light in an absorption spectral band—includes placing a gas between a measurement photodetector and a light source able to emit an incident light wave propagating through the gas to the photodetector. Electrical supply current passes through the light source to bring it to a temperature value. At multiple times: the light source illuminates the gas; the measurement photodetector measures a "measurement" intensity of a light wave transmitted by the gas in a measurement spectral band; and a reference photodetector measures a "reference" intensity of a reference light wave emitted by the light source in a reference spectral band. At each measurement time, a correction function—representative of a variation in the incident light wave's intensity in the measurement band relative to in the reference spectral band—is taken into account based on the measured reference intensity.

13 Claims, 4 Drawing Sheets

(56) References Cited

U.S. PATENT DOCUMENTS

| | | |
|---|---|---|
| 6,191,421 B1 | 2/2001 | Yamamori et al. |
| 6,843,102 B1 | 1/2005 | Shulga et al. |
| 2011/0042570 A1 | 2/2011 | Wong |
| 2015/0338339 A1* | 11/2015 | Hutchings ............ G01N 33/004 |
| | | 356/437 |
| 2017/0038354 A1 | 2/2017 | Gerety |

FOREIGN PATENT DOCUMENTS

| | | | |
|---|---|---|---|
| FR | 3077387 A1 | 8/2019 | |
| WO | 2007/064370 A2 | 6/2007 | |
| WO | WO-2019145649 A1 * | 8/2019 | ......... G01N 21/3504 |

OTHER PUBLICATIONS

International Written Opinion for International Application No. PCT/EP2020/071251, mailed Oct. 6, 2020, 11 pages with English Machine Translation.

* cited by examiner

METHOD FOR ANALYSING A GAS USING AN OPTICAL SENSOR

CROSS-REFERENCE TO RELATED APPLICATIONS

This application is a national phase entry under 35 U.S.C. § 371 of International Patent Application PCT/EP2020/071251, filed Jul. 28, 2020, designating the United States of America and published as International Patent Publication WO 2021/023576 A1 on Feb. 11, 2021, which claims the benefit under Article 8 of the Patent Cooperation Treaty to French Patent Application Serial No. FR1909028, filed Aug. 6, 2019.

TECHNICAL FIELD

The technical field of the disclosure is an optical method for analyzing a gas, employing a black-body or gray-body light source and measuring an absorption of a light wave emitted by the light source.

BACKGROUND

Optical methods are frequently used to analyze gases. Sensors allow the composition of a gas to be determined based on the fact that the species from which the gas is composed have spectral absorption properties that are different from one another. Thus, if an absorption spectral band of a gas species is known, the concentration of the latter may be determined via an estimation of the absorption of the light passing through the gas, using the Beer-Lambert law. This principle allows the concentration of a gas species present in the gas to be estimated.

In the most common methods, the analyzed gas lies between a light source and a photodetector, referred to herein as the measurement photodetector, the latter being intended to measure a light wave transmitted by the gas to be analyzed, the light wave being partially absorbed by the latter. The light source is usually a source emitting in the infrared, the method used usually being designated NDIR detection, NDIR being the acronym of nondispersive infrared. Such a principle has been frequently implemented, and is described, for example, in documents U.S. Pat. No. 5,026,992 and WO2007064370.

Conventional methods generally comprise a measurement of a light wave, referred to herein as the reference light wave, emitted by the source, the reference light wave not being absorbed, or being absorbed negligibly, by the analyzed gas. Measuring the reference light wave allows the intensity of the light wave emitted by the source to be estimated, or the light wave that would be detected by the measurement photodetector in the absence of absorption by the analyzed gas to be estimated. This technology is referred to by the term "double beam." The comparison between the light wave in the presence of gas and the light wave without gas allows the absorption of the gas to be characterized. It is, for example, a question of determining an amount of a gas species in the gas, in the case of the technology referred to herein as "absorption-based NDIR."

The reference light wave is measured by a reference photodetector. It may be a question of a reference photodetector different from the measurement photodetector, and arranged so as to be placed facing the light source, the reference photodetector being associated with a reference optical filter. The reference optical filter defines a reference spectral band, in which the gas to be analyzed exhibits no significant absorption.

According to one approach, described in US2011/0042570, a measurement photodetector and a reference photodetector are used, these two photodetectors detecting a light wave in the same spectral band, in this case an absorption spectral band of CO2. The reference photodetector is placed closer to the light source than the measurement photodetector. Comparing the signals measured by the measurement photodetector and the reference photodetector, respectively, removes the need to know the intensity of the light wave emitted by the source.

Document FR3000548 describes a CO2 sensor comprising a measurement channel, in an infrared spectral band, and a reference channel, in a visible spectral band (0.4 µm to 0.8 µm). The reference channel is considered to be unaffected by the CO2 concentration in the measured gas. In order to take into account the variation in the emission spectrum of the light source, this document describes using a function F representative of the ageing of the light source in the visible and infrared spectral bands, respectively. The function F is approximated by an identity function: thus, the ageing of the light source in the infrared is considered to be equal to the ageing of the light source in the visible.

The inventor has observed that use of a reference light wave may have certain drawbacks. He proposes a method allowing these drawbacks to be overcome, so as to improve measurement precision.

BRIEF SUMMARY

A first subject of the disclosure is a method for measuring an amount of a gas species present in a gas, the gas species being able to absorb light in an absorption spectral band, the method comprising the following steps:

a) placing the gas between a light source and a measurement photodetector, the light source being able to emit an incident light wave, the incident light wave propagating through the gas to the measurement photodetector, the light source being passed through by an electrical supply current, so as to bring the light source to a temperature value;

b) illuminating the gas with the light source;

c) measuring, with the measurement photodetector, an intensity, referred to herein as the measurement intensity, of a light wave transmitted by the gas, in a measurement spectral band comprising the absorption spectral band;

d) measuring, with a reference photodetector, an intensity, referred to herein as the reference intensity, of a reference light wave, the reference light wave being emitted by the light source in a reference spectral band;

steps b) to d) being implemented at a plurality of measurement times, the method comprising, at each measurement time:

e) on the basis of the reference intensity measured by the reference photodetector, taking into account a correction function representative of a variation in an intensity of the incident light wave in the measurement spectral band relatively to an intensity of the incident light wave in the reference spectral band; and f) estimating an amount of the gas species, on the basis of the measurement intensity measured in step c), of the reference intensity measured in step d), and of the correction function taken into account in step e);

the method being characterized in that the correction function is established beforehand in a calibrating phase, by comparing, at various temperature levels, or at various supply-current levels, the light intensities emitted, by a test light source, in the measurement spectral band and in the reference spectral band, respectively, the test light source being considered to be representative of the light source employed in step b), at each measurement time.

According to one embodiment, the calibration is carried out using a theoretical expression that defines an emission intensity of the test light source as a function of the temperature of the light source and of wavelength, the calibration being carried out considering a wavelength in the measurement spectral band and a wavelength in the reference spectral band, respectively. The calibration may comprise determining an ageing function, relating an ageing of the light source, in the reference spectral band, to an ageing of the light source, in the measurement spectral band. The correction function is then determined on the basis of the ageing function.

According to one embodiment, the calibration is carried out experimentally, and comprises:
  placing the test light source facing a test measurement photodetector and facing a test reference photodetector, the test measurement photodetector and the test reference photodetector being representative of the measurement photodetector and of the reference photodetector, respectively;
  illuminating the test measurement photodetector and the test reference photodetector with the test light source, the test light source being successively brought to various temperature values by various supply currents; and
  at each temperature value, comparing a light intensity detected by the test measurement photodetector, in the measurement spectral band, with a light intensity detected by the test reference photodetector, in the reference spectral band, the correction function being established on the basis of the comparisons made at each temperature value.

The calibration may comprise determining an ageing function, relating an ageing of the light source, in the reference spectral band, to an ageing of the light source, in the measurement spectral band, the method being such that the correction function is determined on the basis of the ageing function.

The test light source may be none other than the light source employed in step b), at each measurement time.

The method may be such that:
  step e) comprises, on the basis of the correction function and of the intensity measured by the reference photodetector in step d), estimating an intensity that would be detected, by the measurement photodetector, in the absence of gas; and
  in step f), the amount of gas species is determined on the basis of a comparison between the intensity measured by the measurement photodetector, in step c), and the intensity estimated in step e).

The method may be such that:
  step e) comprises, on the basis of the correction function and of the intensity measured by the reference photodetector in step d), determining a corrected intensity, the corrected intensity corresponding to an intensity that would be detected, by the measurement photodetector, in the absence of ageing of the light source; and
  in step f), the amount of gas species is determined on the basis of a comparison between the corrected intensity resulting from step e) and an estimate of an intensity that would be detected by the measurement photodetector, in the absence of gas between the light source and the measurement photodetector, and in the absence of ageing of the light source.

Whatever the embodiment, step e) may comprise estimating an ageing of the light source, in the reference spectral band, on the basis of the reference intensity measured at the measurement time, and of the reference intensity measured at an initial time. The ageing of the light source, in the reference spectral band, may be computed on the basis of a comparison between the reference intensity measured at the measurement time and the reference intensity measured at the initial time. The comparison may take, for example, the form of a subtraction or of a ratio. The comparison may be normalized by the reference intensity measured at the initial time.

Whatever the embodiment, the calibration aims to establish an ageing function, to estimate an ageing of the light source in the measurement spectral band on the basis of an ageing of the light source in the reference spectral band. The ageing, in a spectral band, corresponds to a comparison between an intensity measured, in the spectral band, at the measurement time, and an intensity measured, in the spectral band, at an initial time.

According to one embodiment, the light source is a black body or considered to be a black body.

A second subject of the disclosure is a device for determining an amount of a gas species in a gas, the device comprising:
  a light source configured to emit an incident light wave that propagates to the gas, the incident light wave lying in an absorption spectral band of the gas species;
  a measurement photodetector, configured to detect a light wave transmitted by the gas, at various measurement times, in a measurement spectral band, and to measure an intensity, referred to herein as the measurement intensity, thereof,
  a reference photodetector, configured to measure an intensity, called the reference intensity, of a reference light wave emitted by the light source, in a reference spectral band, at the various measurement times; and
  a processor, for implementing steps e) and f) of a method according to the first subject of the disclosure, on the basis of the reference intensity and of the measurement intensity.

The processor may notably implement a correction function established in a calibrating phase, by comparing, at various temperature levels, or at various supply-current levels, the light intensities emitted, by a test light source, in the measurement spectral band and in the reference spectral band, respectively, the test light source being considered to be representative of the light source employed in step b) of a method according to the first subject of the disclosure, at each measurement time.

The disclosure will be better understood on reading the description of the exemplary embodiments, which are described, in the rest of the description, with reference to the figures listed below.

BRIEF DESCRIPTION OF THE DRAWINGS

FIG. 2B was obtained using a theoretical expression for the emissivity of the light source as a function of temperature and of wavelength.

FIG. 2C was obtained from experimental trials.

DETAILED DESCRIPTION

Figure 1A:
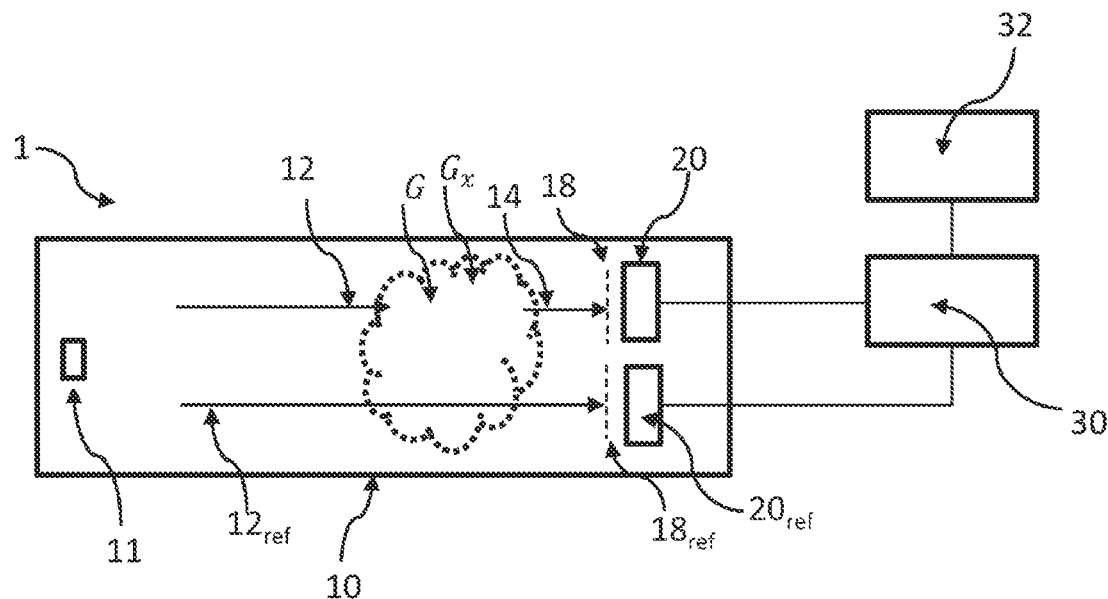
FIG. 1A shows an example of a device allowing embodiments of the disclosure to be implemented.

FIG. 1A is an example of a gas-analyzing device 1. This device comprises an enclosure 10 defining an internal space inside of which are located:
- a light source 11, able to emit a light wave, referred to herein as the incident light wave 12, so as to illuminate a gas G lying in the internal space. The incident light wave 12 lies in an illumination spectral band $\Delta_{12}$.
- a photodetector 20, referred to herein as the measurement photodetector, configured to detect a light wave 14 transmitted by the gas G, under the effect of the illumination of the latter by the incident light wave 12. The light wave 14 is designated by the term measurement light wave. It is detected, by the measurement photodetector 20, in a measurement spectral band $\Delta_{mes}$, and
- a reference photodetector $20_{ref}$, configured to detect a light wave, referred to herein as the reference light wave $12_{ref}$, in a reference spectral band $\Delta_{ref}$. The reference spectral band $\Delta_{ref}$ is a spectral band in which the absorption of the incident light wave 12 by the gas G is considered to be negligible.

The reference spectral band $\Delta_{ref}$ is different from the measurement spectral band $\Delta_{mes}$. The measurement spectral band $\Delta_{mes}$ may notably be wider than the reference spectral band $\Delta_{ref}$. The measurement spectral band $\Delta_{mes}$ may comprise the reference spectral band $\Delta_{ref}$.

The gas G contains a gas species $G_x$ an amount $c_x(k)$, a concentration, for example, of which it is sought to determine, at a measurement time k. This gas species absorbs a measurable percentage of the light in an absorption spectral band $\Delta_x$.

The light source 11 is able to emit the incident light wave 12, in the illumination spectral band $\Delta_{12}$, the latter possibly extending between the near ultraviolet and the mid infrared, for example between 200 nm and 10 m, and most often between 1 μm and 10 μm. The absorption spectral band $\Delta_x$ of the analyzed gas species $G_x$ is comprised in the illumination spectral band $\Delta_{12}$. The light source 11 may notably be a pulsed source, the incident light wave 12 being a pulse of duration generally comprised between 100 ms and 1 s. The light source 11 may notably be a filament light source the filament of which is suspended and heated to a temperature comprised between 400° C. and 800° C. Its emission spectrum, in the illumination spectral band $\Delta_{12}$, corresponds to the emission spectrum of a black body.

The measurement photodetector 20 is preferably associated with an optical filter 18 (also referred to herein as a "measurement filter" 18), defining the measurement spectral band $\Delta_{mes}$ encompassing all or part of the absorption spectral band $\Delta_x$ of the gas species.

In the example in question, the measurement photodetector 20 is a thermopile, able to deliver a signal depending on the intensity of the detected light wave. Alternatively, the measurement photodetector may be a photodiode or another type of photodetector.

The reference photodetector $20_{ref}$ is placed beside the measurement photodetector 20 and is of the same type as the latter. It is associated with an optical filter, referred to herein as the reference optical filter $18_{ref}$. The reference optical filter $18_{ref}$ defines the reference spectral band $\Delta_{ref}$ corresponding to a range of wavelengths not absorbed by the gas species in question. The reference bandwidth $\Delta_{ref}$ is centered, for example, on the wavelength 3.91 μm.

The intensity I(k) of the light wave 14 detected by the measurement photodetector 20, which is referred to herein as the measurement intensity, at a measurement time k, depends on the amount $c_x(k)$ at the measurement time, according to the Beer-Lambert law:

$$\text{abs}(k) = 1 - \frac{I(k)}{I_0(k)} = 1 - e^{-\mu(c_x(k))l} \quad \text{Expression (1)}$$

where:
- $\mu(c_x(k))$ is an absorption coefficient dependent on the amount $c_x(k)$ at the time k;
- l is the thickness of gas passed through by the light wave in the enclosure 10; and
- $I_0(k)$ is the intensity of the incident light wave, at the time k, which corresponds to the intensity of the light wave, in the measurement spectral band $\Delta_{mes}$, that would reach the measurement photodetector 20 in the absence of absorbent gas from the enclosure.

The comparison of I(k) and $I_0(k)$, which takes the form of a ratio $$\frac{I(k)}{I_0(k)},$$

allows an absorption abs(k) generated by the gas species in question at the time k to be defined.

During each pulse of the light source 11, it is thus possible to determine $\mu(c_x(k))$, this allowing $c_x(k)$ to be estimated given that the relationship between $c_x(k)$ and $\mu(c_x(k))$ is known.

Expression (1) assumes the intensity $I_0(k)$ of the incident light wave 12 is known at the measurement time k.

Figure 1B:
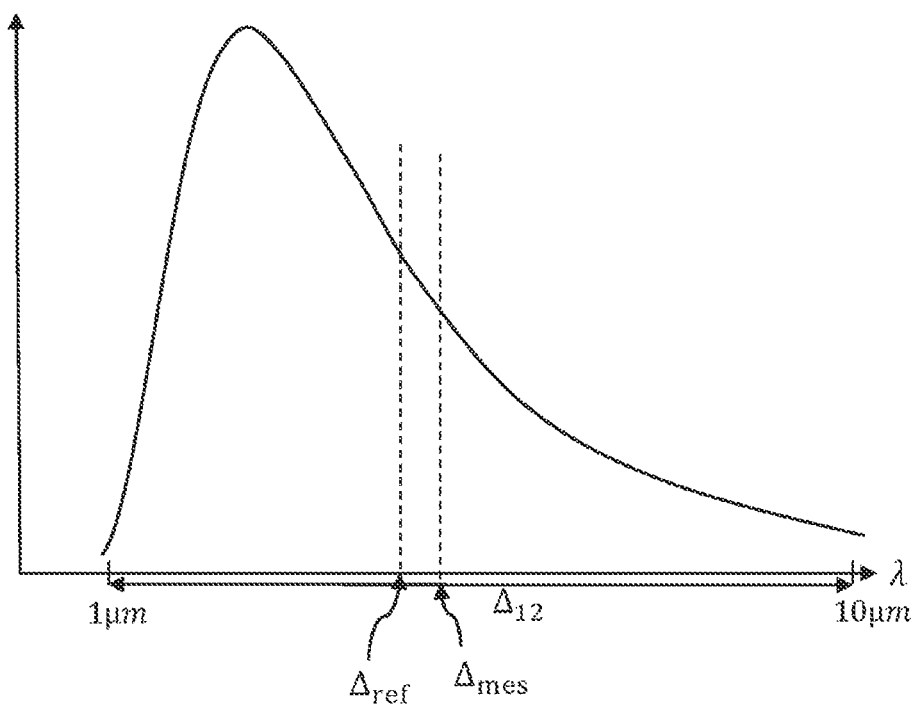
FIG. 1B shows a schematic of an emission spectrum of a black-body light source.

FIG. 1B schematically shows an emission spectrum of a black-body light source 11 obeying Planck's law:

$$L(\lambda, T) = \frac{2hc^2}{\lambda^5} \frac{1}{e^{\frac{hc}{\lambda KT}} - 1} \quad \text{Expression (2)}$$

where
- L(λ, T) is luminance, which is dependent on wavelength A and on the surface temperature T of the black body;
- h is Planck's constant;
- K is Boltzmann's constant; and
- c is the speed of light in air.

The emission spectrum S of the light source 11 corresponds to the variation in the luminance L(λ, T) as a function of λ, when the light source is brought to a temperature T. Generally, the temperature T is comprised between 400° C. and 800° C.

In FIG. 1B the illumination spectral band $\Delta_{12}$ of the light source 11 has been shown extending between 1 μm and 10 μm. In FIG. 1B, the reference spectral band $\Delta_{ref}$ and the measurement spectral band $\Delta_{mes}$ have furthermore been represented by dashed lines.

This type of light source is particularly advantageous, because it allows the illumination spectrum S to be modulated via simple modulation of the temperature T of the source. Thus, with each temperature T is associated one illumination spectrum S.

It is known that the emissivity of a black-body or graybody light source varies with time, and may notably undergo a decrease resulting from the ageing of the light source. The time-dependent variation in the emission of the light source 11 is taken into account via the reference photodetector $20_{ref}$. The latter is arranged to detect a reference light wave $12_{ref}$ representative of the incident light wave 12 emitted by the light source 11. The reference light wave $12_{ref}$ reaches the reference photodetector $20_{ref}$ without interacting with the gas G, or without interacting with the latter significantly.

The intensity of the reference light wave $12_{ref}$, detected by the reference photodetector $20_{ref}$, at the measurement time k, is designated by the term reference intensity $I_{ref}(k)$. On the basis of $I_{ref}(k)$, knowing the emission spectrum of the light source 11, it is possible to estimate the intensity $\hat{I}_0(k)$ of the light wave that would reach the measurement photodetector 20 in the absence of gas G. The reference intensity may also allow the measurement intensity I(k) to be corrected to take into account the ageing of the light source 11.

The device comprises a microprocessor 30, connected to a memory 32 containing instructions allowing the steps of the method described below to be implemented.

According to a first embodiment, the microprocessor 30 is configured to receive a signal representative of the intensity $I_{ref}(k)$ of the reference light wave $12_{ref}$, measured by the reference photodetector $20_{ref}$ at each measurement time k. The microprocessor 30 estimates the intensity $\hat{I}_0(k)$ on the basis of $I_{ref}(k)$.

On the basis of I(k), it is possible to estimate the absorption of the incident light wave using the expression:

$$\text{abs}(k) = 1 - \frac{I(k)}{\hat{I}_0(k)} \quad \text{Expression (3)}$$

Using expression (1), $\mu(c_x(k))$, then $c_x(k)$ are obtained.

According to a second embodiment, the microprocessor 30 is configured to receive a signal representative of the reference intensity $I_{ref}(k)$, then to correct the measured intensity I(k). The corrected intensity is denoted I*(k). The latter corresponds to the intensity that would be measured by the measurement photodetector without the ageing of the light source. The absorption abs(k) of the incident light wave may then be obtained using the expression:

$$\text{abs}(k) = 1 - \frac{I^*(k)}{I_0(k=0)}, \quad \text{Expression (4)}$$

where $I_0(k=0)$ is the light wave incident on the measurement photodetector, without absorbing gas in the enclosure, at the initial measurement time k=0, i.e., when the light source 11 is considered new. Using expression (1), $\mu(c_x(k))$, then $c_x(k)$ are obtained.

The ratio between the emissivity of the light source 11 in the reference spectral band $\Delta_{ref}$ and in the measurement spectral band $\Delta_{mes}$, respectively, is usually considered to decrease in the same way. According to such a hypothesis:

when the first embodiment is implemented, the intensity $\hat{I}_0(k)$ is simply estimated on the basis of $I_{ref}(k)$, based on knowledge of the theoretical emission spectrum of the light source, or using an expression of the type $$\hat{I}_0(k) = I_{ref}(k) \frac{I_0(k=0)}{I_{ref}(k=0)}; \quad \text{Expression (5)}$$

when the second embodiment is implemented, the corrected intensity I*(k) is obtained on the basis of $I_{ref}(k)$, by applying a correction function:

$$I^*(k) = \frac{I_{ref}(k=0)}{I_{ref}(k)} I(k). \quad \text{Expression (6)}$$

However, the inventor has observed that the ageing of the light source 11 affects the reference spectral band $\Delta_{ref}$ and the measurement spectral band $\Delta_{mes}$ differently. Contrary to what is suggested in document FR3000548, the ageing in the measurement spectral band cannot be considered to be similar to the ageing in the reference spectral band.

The inventor has carried out a preliminary trial, in which he used a test measurement sensor (e.g., photodetector) 20' and a test reference sensor (e.g., photodetector) $20'_{ref}$ that were similar to the measurement and reference sensors described with reference to FIG. 1A, respectively. During the calibration, the gas analyzed was a known gas, in fact $CH_4$ in ambient air, the concentration of $CH_4$ being considered to be zero. The experimental parameters were as follows:

Measurement filter 18: Heimann filter F3.25-180, centered on a wavelength of 3.25 μm, which corresponds to an absorption wavelength of $CH_4$.

Reference filter $18_{ref}$: Heimann filter F3.91-90, centered on a wavelength of 3.91 μm.

Measurement and reference photodetectors 20, $20_{ref}$: Heimann thermopile HCM Cx2 Fx.

In this preliminary trial, the measurement filter 18 defined a measurement spectral band $\Delta_{mes}$ centered on the deliberately narrow wavelength (3.25 μm), so as to highlight the observed ageing.

Figure 2A:
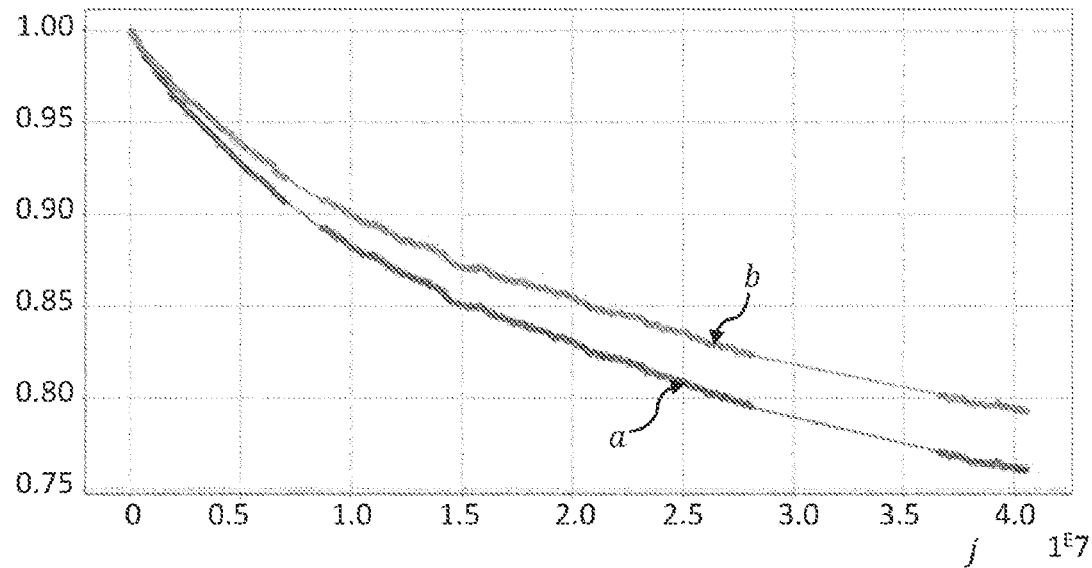
FIG. 2A shows the observed decrease in the light intensity emitted by a light source in two different spectral bands.

A test light source 11', similar to the light source described with reference to FIG. 1A, was pulsed on at various times j, between an initial time j=0 and a final time j=J. Each pulse lasted 60 ms, and was spaced from the following pulse by a time interval of 500 ms. About 40 million pulses were applied. FIG. 2A shows the variation as a function of time:

in a measurement intensity I(j), measured by the test measurement photodetector 20' in the measurement spectral band $\Delta_{mes}$ (curve a); and in the reference intensity $I_{ref}(j)$, measured by the test reference photodetector $20'_{ref}$ in the reference spectral band $\Delta_{ref}$ (curve b).

These variations are normalized by the measurement intensity and the reference intensity at the initial calibration time (j=0), respectively.

Certain parts of the curve shown in FIG. 2A have been interpolated. It may be seen that, in FIG. 2A, the measurement intensity I(j) and the reference intensity $I_{ref}(j)$ decrease over time, this being expected. This corresponds to the ageing of the light source 11. It may also be seen that the respective decreases, in the measurement spectral band $\Delta_{mes}$ and in the reference spectral band $\Delta_{ref}$, are different. This means that the ageing of the light source 11 in the measurement spectral band $\Delta_{mes}$ is different from the ageing of the light source 11 in the reference spectral band $\Delta_{ref}$. Thus, the ratio $$\frac{I(j)}{I_{ref}(j)}$$

varies as a function of time j. This means that the ageing of the light source 11 is accompanied by a slight modification of the emission spectrum.

An important element of embodiments of the disclosure is that the ageing of the light source may be considered to be likened to a variation in its temperature, and more precisely to a decrease in its temperature. When using the light source, the latter is brought to a nominal temperature, for example, equal to 870 K. The inventor has observed that as it ages, the light source behaves as though its temperature is dropping, below the nominal temperature. The nominal temperature corresponds to the first moments of operation of the light source. As the number of pulses emitted by the light source increases, the behavior of the light source may be modeled by considering its temperature to gradually decrease, below the nominal temperature.

The light source is considered to behave like a black body. In expression (2), it may be seen that luminance depends both on temperature and on wavelength. The inventor has used expression (2), considering various temperature levels, to simulate the effect of a decrease in the temperature of the light source on the light intensity emitted by the latter, at various wavelengths:

at $\lambda=3.91$ μm, which corresponds to a reference spectral band that is considered not absorbed, or absorbed negligibly, by the commonest gas species;

at $\lambda=3.25$ μm, which corresponds to an absorption spectral band of methane ($CH_4$); and at $\lambda=4.26$ μm, which corresponds to an absorption spectral band of carbon dioxide ($CO_2$).

On the basis of a nominal temperature level equal to 870 K (kelvin), for each of the wavelengths mentioned above, emissivity losses were calculated (denoted EL).

Table 1, below, collates values of emissivity loss EL as a function of the temperature of the source for the three wavelengths mentioned above. Each value of emissivity loss was calculated, at the wavelength A, and at the temperature T, using the expression:

$$EL(\lambda, T) = \frac{L(\lambda, T) - L(\lambda, T_0)}{L(\lambda, T_0)} \times 100, \quad \text{Expression (7)}$$

where $T_0$ corresponds to the nominal temperature.

TABLE 1

| T | EL($\lambda$ = 3.25 μm, T) (%) | EL($\lambda$ = 3.91 μm, T) (%) | EL($\lambda$ = 4.26 μm, T) (%) |
|---|---|---|---|
| 870 (T = $T_0$) | 0.0 | 0.0 | 0.0 |
| 861.5 | 5.2 | 4.3 | 4.0 |
| 853 | 10.1 | 8.6 | 7.9 |
| 844.5 | 14.9 | 12.7 | 11.8 |
| 836 | 19.6 | 16.7 | 15.5 |
| 827.5 | 24.1 | 20.6 | 19.2 |
| 819 | 28.4 | 24.4 | 22.7 |

Figure 2B:
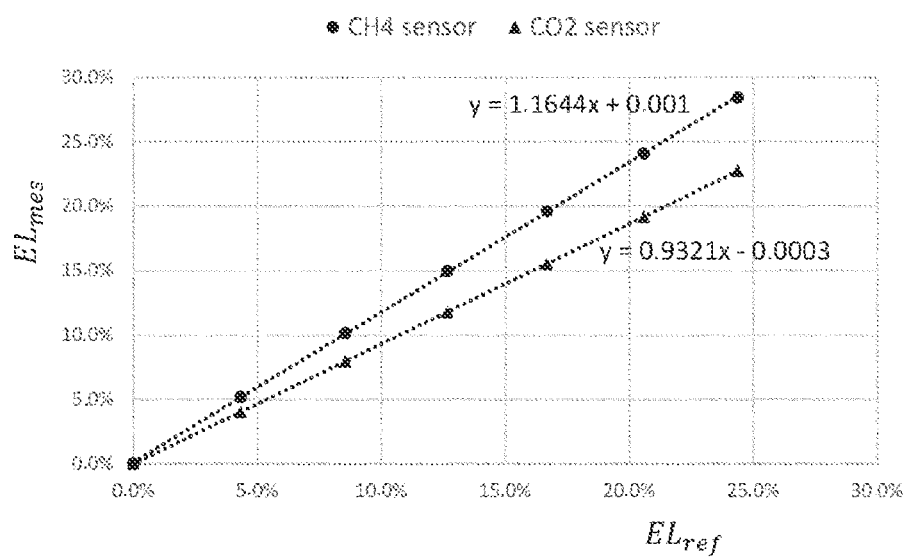
FIG. 2B illustrates the emissivity loss of the light source in a measurement spectral band as a function of the emissivity loss of the light source in a reference spectral band.

FIG. 2B shows the emissivity loss $EL_{mes}$ in the measurement spectral band (y-axis) as a function of the emissivity loss in the reference spectral band $EL_{ref}$ (x-axis). The measurement spectral band corresponds either to the wavelength $\lambda=3.25$ μm (circles in FIG. 2B), or to the wavelength $\lambda=4.26$ μm (triangles in FIG. 2B). The reference spectral band corresponds to the wavelength $\lambda=3.91$ μm.

Following a linear interpolation of the results, it is observed that:

$EL_{mes}(\lambda=3.25 \text{ μm}) \approx 1.1644 EL_{ref}+0.001=h(EL_{ref},\Delta_{mes})$ Expression (8)

and $EL_{mes}(\lambda=4.26 \text{ μm}) \approx 0.9321 EL_{ref}+0.0003=h(EL_{ref}, \Delta_{mes})$ Expression (9)

The function h is a function expressing the ageing of the source in the measurement spectral band, on the basis of the ageing of the source in the reference spectral band. The function h is obtained, on the basis of theoretical calculations, taking into account various source temperatures, using expression (2).

It may be seen that the emissivity loss, in each measurement spectral band, varies linearly with respect to the emissivity loss in the reference spectral band. Moreover, the slope of each straight line is different from 1, this confirming the fact that the intensity emitted by the light source varies, over time, in a different way, at the wavelengths in question. Specifically, if the ageing were identical at each wavelength, as considered in the prior art, the slope of each straight line would be equal to 1.

Subsequently to the theoretical calculations that gave rise to the results presented in Table 1 and shown in FIG. 2B, the inventor carried out experimental trials, using a test light source, a test measurement photodetector and a test reference photodetector, such as described above. The test measurement photodetector was associated with a measurement optical filter, centered on the wavelength of 3.25 μm.

The reference photodetector was associated with a reference optical filter, centered on the wavelength of 3.91 μm.

In a first series of trials, the inventor carried out ageing trials at each wavelength. The test source was placed facing a test measurement photodetector, associated with the measurement optical filter, and facing a test reference photodetector, associated with the reference optical filter. The ageing trials aimed to experimentally measure the ageing of the light source, at each wavelength. The test measurement source was activated with 18 million successive pulses, the duration of each pulse being 60 ms, the time interval between two successive pulses amounting to 500 ms. Thus, the duration of this first series of ageing trials was approximately 104 days.

After j pulses, the intensities $I_j$, $I_{ref,j}$ measured by the test measurement photodetector and the reference measurement photodetector, respectively, at times j, were measured. On the basis of each measurement, the detected signal losses, which were representative of the emissivity losses of the light source, expressed in %, at each wavelength, were calculated, using the expressions:

$$EL_{ref}(j) = \frac{I_{ref}(j=0) - I_{ref}(j)}{I_{ref}(j=0)} \times 100 \qquad \text{Expression (10)}$$

and $$EL_{mes}(j) = \frac{I(j=0) - I(j)}{I(j=0)} \times 100 \qquad \text{Expression (11)}$$

The quantities $EL_{ref}(j)$ and $EL_{mes}(j)$, such as defined in expressions (10) and (11), are representative of the ageing of the light source in the reference and measurement spectral bands, respectively. The ratio between these two quantities corresponds to the differential ageing of the light source, in the reference and measurement spectral bands.

Table 2 collates the results of these measurements.

TABLE 2

| Reference of the measurement time (j) | $EL_{mes}(j)$ (%) | $EL_{ref}(j)$ (%) |
|---|---|---|
| 0 | 0.0 | 0.0 |
| 2073600 | 7.6 | 6.3 |
| 4147200 | 10.2 | 8.7 |
| 6220800 | 13.2 | 11.3 |
| 9676800 | 18.5 | 16.0 |
| 11750400 | 20.2 | 17.4 |
| 17971200 | 24.0 | 20.9 |

Experimental simulations of ageing of another test light source were performed. The supply of electrical power to the test light source was brought to various power levels, so as to vary the temperature of the source. The initial nominal power was 2500 µW, which corresponded to a nominal temperature of the source equal to 870 K. The power delivered by the supply current was then gradually decreased. At each power level $P_j$, the intensities $I(P_j)$ and $I_{ref}(P_j)$ measured by a test measurement photodetector and a test reference photodetector, respectively, were measured. FIG. 2D shows a function allowing a link to be established between the power delivered by the supply current (x-axis—mW) and the temperature of the light source (y-axis, in ° C.).

On the basis of each measurement, the detected signal losses, which were representative of the emissivity loss of the light source, expressed in %, at each wavelength, were calculated, using the expressions:

$$EL_{ref}(j) = \frac{I_{ref}(P_{j=0}) - I_{ref}(P_j)}{I_{ref}(P_{j=0})} \times 100 \qquad \text{Expression (12)}$$

and $$EL_{mes}(j) = \frac{I(P_{j=0}) - I(P_j)}{I(P_{j=0})} \times 100 \qquad \text{Expression (13)}$$

Table 3 collates the results of these measurements.

TABLE 3

| Power $P_j$ | Temperature (K) | $EL_{mes}(j)$ (%) | $EL_{ref}(j)$ (%) |
|---|---|---|---|
| 2500 ($P_0$) | 870 | 0.0 | 0.0 |
| 2450 | 863 | 2.8 | 2.6 |
| 2400 | 858 | 5.9 | 5.2 |
| 2300 | 843 | 11.2 | 9.9 |
| 2200 | 830 | 18.2 | 15.1 |
| 2100 | 815 | 22.6 | 20.1 |
| 2000 | 800 | 27.9 | 25 |

Figure 2C:
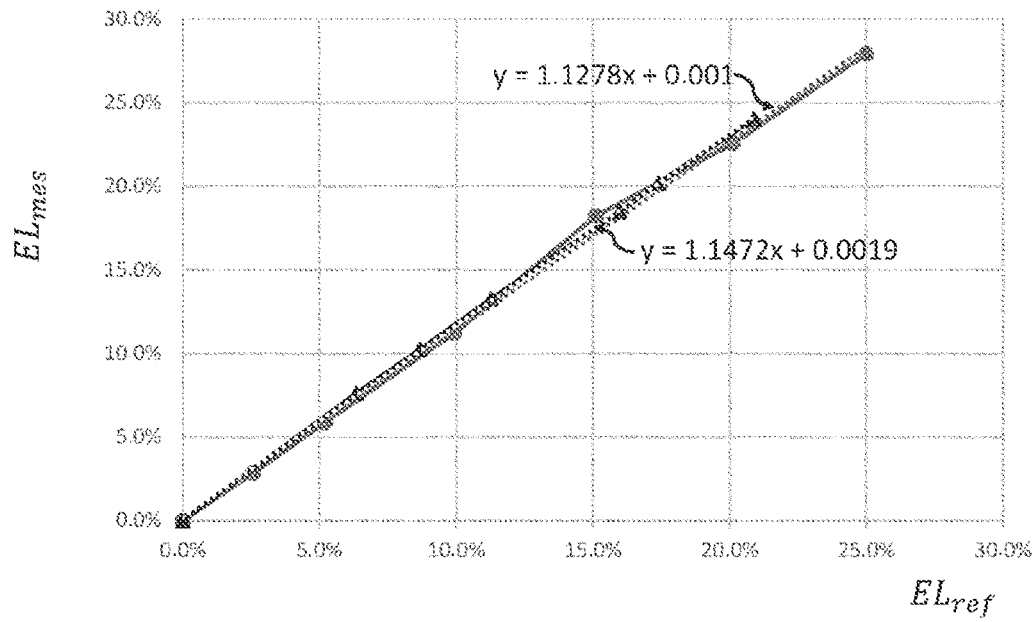
FIG. 2C illustrates a relative decrease in the signal detected by a measurement photodetector, in a measurement spectral band.
Figure 2D:
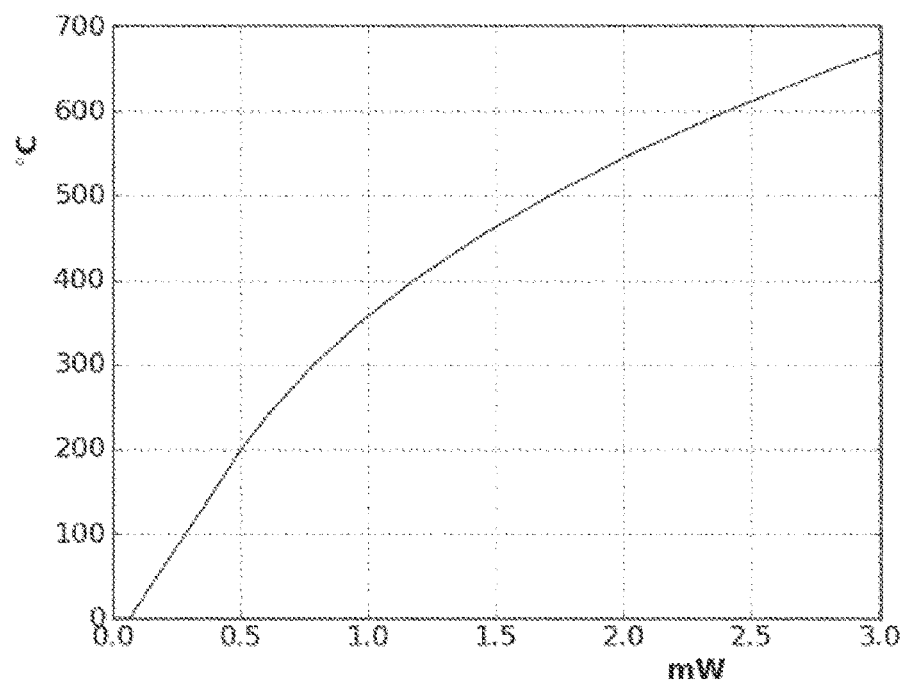
FIG. 2D shows a relationship between a power of an electrical current supplied to a light source and the temperature of the light source.

The measurements presented in Tables 2 and 3 are shown in FIG. 2C. FIG. 2C shows the relative detected-signal loss $EL_{mes}$ in the measurement spectral band (y-axis) as a function of the relative detected-signal loss $EL_{ref}$ in the reference spectral band (x-axis). The measurement spectral band corresponds to the wavelength λ=3.25 µm. The reference spectral band corresponds to the wavelength λ=3.91 µm. In FIG. 2C, the squares and circles correspond to trials in which ageing was simulated experimentally (Table 3) and to trials in which actual ageing was measured (Table 2), respectively.

Following a linear interpolation of the results, it is observed that:

for the results obtained in the trials in which actual ageing was measured:

$$EL_{mes} \approx 1.1472 EL_{ref} + 0.0019 = f(EL_{ref}, \lambda_{mes}) \qquad \text{Expression (14),}$$

this corresponding to the straight white dashed line. The function $f$ is a function expressing the ageing of the source in the measurement spectral band, on the basis of the ageing of the source in the reference spectral band. The function $f$ was obtained from trials in which actual ageing was measured.

for the results obtained in the trails in which ageing was simulated experimentally:

$$EL_{mes} \approx 1.1278 EL_{ref} + 0.001 = g(EL_{ref}, \lambda_{mes}) \qquad \text{Expression (15),}$$

this corresponding to the straight black dashed line. The function g is a function expressing the ageing of the source in the measurement spectral band, on the basis of the ageing of the source in the reference spectral band. The function g was obtained from trials in which ageing was simulated by varying the temperature of the source.

The two series of trials led to a linear expression being obtained, relating the effect of ageing in the reference spectral band to the effect of ageing in the measurement spectral band. It may be seen that expressions (14) and (15) have comparable slopes (respectively 1.1472 and 1.1278), this also being comparable to the slope resulting from expression (8), i.e., 1.1644.

In the preceding trials, the trial the most representative of the ageing of the light source was probably the trial described with reference to Table 2. In this trial, a test light source was used for a very long period of time, in order to experimentally measure the differential ageing in the reference spectral band and in the measurement spectral band. The differential ageing may notably be expressed in the form of a ratio between the quantities $EL_{mes}(j)$ and $EL_{ref}(j)$. This corresponds to the slope of expression (14), i.e., 1.1472.

However, such a trial takes along time to implement. The above results show that the differential ageing of the light source may be calibrated by taking into account various temperature levels, or various supply-power levels, of the light source. This is an important element of embodiments of the disclosure: the ageing of a light source may be determined by performing a calibration in which various temperature levels (or various supply-current levels) of the light source are taken into account.

According to a first possibility, described with reference to Table 1 and FIG. 2B, a theoretical expression for the luminance of the source, at various temperatures, in the measurement and reference spectral bands, respectively, is taken into account. A theoretical differential ageing, representing the relative change in the amount of light emitted by the light source in the measurement and reference spectral bands, is thus obtained. At the wavelengths in question (3.25 µm and 3.91 µm), the theoretical differential ageing may be considered, to a first approximation, to be the slope of expression (8), i.e., 1.1644. According to this first possibility, since the ageing of the light source in the reference spectral band is known, it is possible to estimate the ageing of the light source in the measurement spectral band, by applying the function h defined by expression (8).

According to a second possibility, described with reference to Table 3 and FIG. 2C, the temperature of a test light source is varied experimentally, for example, by modifying the power delivered by the supply current. At various power levels (or at various temperature levels), the relative change in the amount of light emitted by the light source in the measurement and reference spectral bands is measured experimentally. At the wavelengths in question (3.25 µm and 3.91 µm), the theoretical differential ageing may be considered, to a first approximation, to be the slope of expression (15), i.e., 1.1278. According to this second possibility, since the ageing of the light source in the reference spectral band is known, it is possible to estimate the ageing of the light source in the measurement spectral band, by applying the function g defined by expression (15). This type of experimental calibration is easy and quick to implement. When a plurality of gas-analyzing devices is present, each device consisting of a light source, of a measurement photodetector and of a reference photodetector, such a calibration may be performed on the light source of each device, individually. In other words, the test light source is none other than the light source of the device. Alternatively, such a calibration may be carried out with a test light source considered to be representative of the light source with which the analyzing device is equipped.

The first possibility is purely theoretical. It takes into account only the ageing of the light source. The second possibility is more experimental, and also takes into account a potential variation in the response of the measurement photodetector or reference photodetector.

Whichever possibility employed, it is possible, on the basis of an ageing of the light source, measured in the reference spectral band, to estimate an ageing of the light source in the measurement spectral band. The ageing of the light source in the reference spectral band may be estimated by comparing the light intensity, in the reference spectral band, between an initial time and a measurement time. The comparison may take, for example, the form of a subtraction. The comparison may be normalized by the light intensity, in the reference spectral band, at the initial time, as in expressions (10) or (12). This allows an ageing comprised between 0 and 1 to be obtained.

It follows from the foregoing that, by taking into account, theoretically (first possibility) or experimentally (second possibility), a variation in the temperature of the light source, and more precisely a decrease in the temperature of the light source below a nominal temperature, it is possible to determine a correction function $\delta$ characterizing the relative variation in the emissivity of the light source in the two spectral bands $\Delta_{mes}$ and $\Delta_{ref}$. By measuring the ageing of the light source in the reference spectral band (corresponding to the quantity $EL_{ref}$) the correction function $\delta$ allows an ageing of the light source in the measurement spectral band (corresponding to the quantity $EL_{mes}$ such as defined in expression (11)) to be estimated.

During operation of the detector, such as described with reference to expression (1), at each measurement time k, on the basis of:
- a measurement of the reference light intensity $I_{ref}(k=0)$ at an initial time;
- a measurement of the reference light intensity $I_{ref}(k)$ at a measurement time k; and
- the correction function $\delta$, applied to the reference light intensity $I_{ref}(k)$, allows the light intensity $\hat{I}_0(k)$, emitted by the light source, at the time k, in the measurement spectral band, in the absence of gas between the light source and the measurement photodetector, to be estimated.

The correction function may be such that:

$$\hat{I}_0(k) = \delta(I_{ref}(k)) \quad \text{Expression (16)}$$

Depending on the calibration performed, the correction function $\delta$ is such that:

$$\hat{I}_0(k) = \delta(I_{ref}(k)) = I_0(k=0) \times \left[1 - \frac{h(EL_{ref}(k), \lambda_{mes}))}{100}\right] \quad \text{Expression (17)}$$

with $$EL_{ref}(k) = \frac{I_{ref}(k=0) - I_{ref}(k)}{I_{ref}(k=0)} \times 100 \quad \text{Expression (18)}$$

The quantity $I_0(k=0)$ corresponds to the intensity, measured, by the measurement photodetector, at the initial time k=0, in the absence of gas between the measurement photodetector and the light source. It may be measured, by the measurement photodetector, in the absence of gas between the light source and the measurement photodetector. It may also be estimated, on the basis of $I_{ref}(k=0)$, for example, using expression (2), as the shape of the emission spectrum of the light source is known.

The quantity $I_{ref}(k=0)$ corresponds to the reference intensity measured at the initial time (k=0).

Expression (17) assumes use of the source-ageing estimation function h determined theoretically, on the basis of expression (2), as described with reference to Table 1 and FIG. 2B.

It is possible to use a source-ageing function g determined experimentally by taking into account various temperature values, as described with reference to Table 3 and FIG. 2C. In this case, the correction function $\delta$ is such that:

$$\hat{I}_0(k) = \delta(I_{ref}(k)) = I_0(k=0) \times \left[1 - \frac{g(EL_{ref}(k), \lambda_{mes}))}{100}\right] \quad \text{Expression (19)}$$

Figure 3:
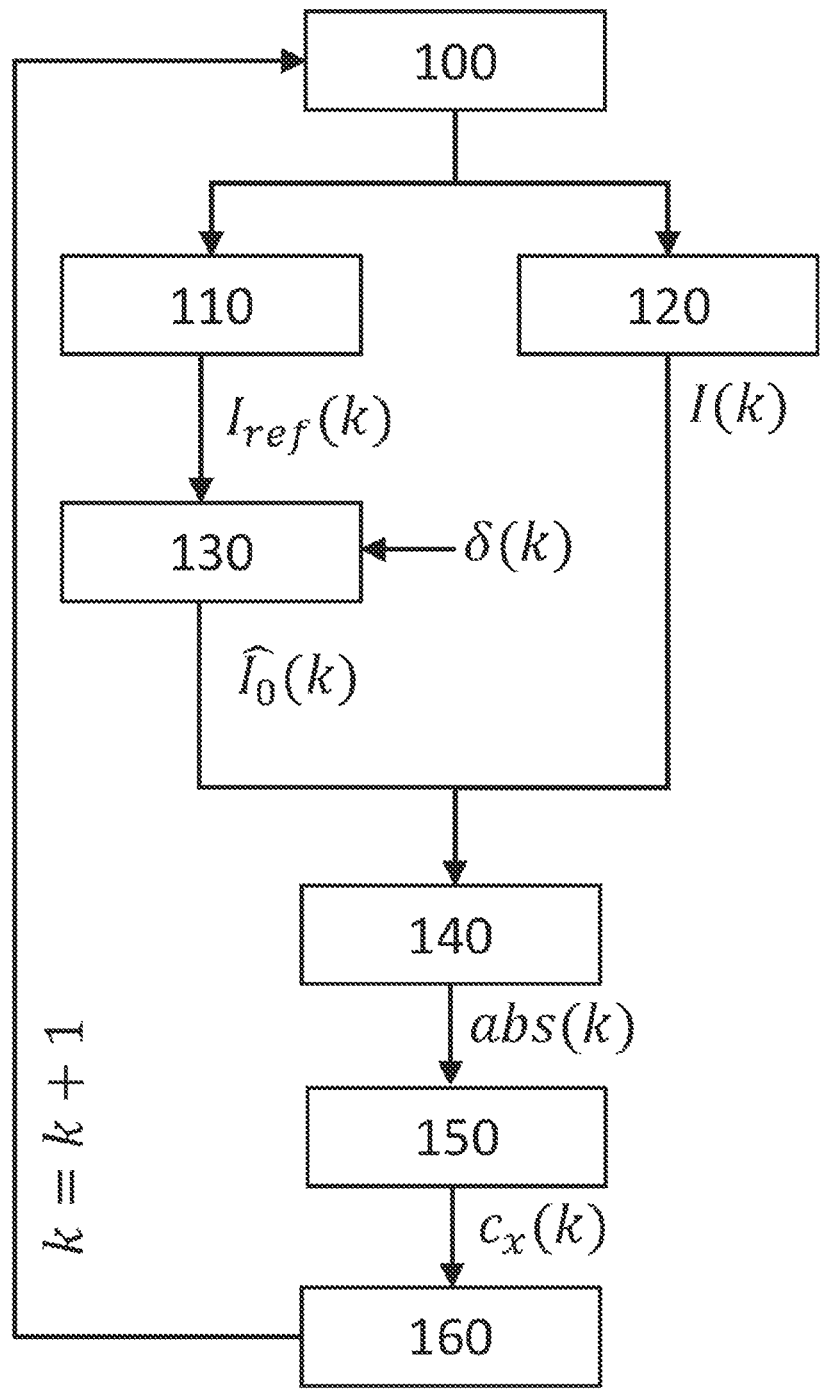
FIG. 3 shows the main steps of a method implementing embodiments of the disclosure.

FIG. 3 shows the main steps of a measuring method implementing embodiments of the disclosure.

Step 100: illuminating the gas at a time k.

Step 110: measuring the reference intensity $I_{ref}(k)$, in the reference spectral band $\Delta_{ref}$, with the reference photodetector 20$_{ref}$.

Step 120: measuring the intensity I(k) of the radiation (light wave) 14 transmitted by the gas, in the measurement spectral band $\Delta_{mes}$, with the measurement photodetector 20.

Step 130: estimating an intensity $\hat{I}_0(k)$ that would be detected by the measurement photodetector 20, in the measurement spectral band $\Delta_{20}$, in the absence of gas in the enclosure. This estimation is carried out taking into account the correction function $\delta(k)$, and applying the expression:

$$\hat{I}_0(k) = \delta(I_{ref}(k)).$$

Step 140: estimating an absorption $$abs(k) = 1 - \frac{I(k)}{\hat{I}_0(k)}$$

in the measurement spectral band $\Delta_{mes}$.

Step 150: on the basis of the absorption, estimating an amount $c_x(k)$ of a gas species $G_x$ on the basis of the ratio by applying expression (1).

Step 160: reiterating steps 100 to 150, with incrementation of the measurement time k, or exiting from the algorithm.

Step 130 assumes the ageing $EL_{ref}(k, \Delta_{mes})$ of the source has been determined, in the reference spectral band $\Delta_{ref}$. As indicated above, the ageing, in the reference spectral band, corresponds to a comparison between the reference intensity, at the measurement time k, and a reference intensity, at an initial time.

Simulated measurements were obtained considering the gas to be analyzed to contain a constant concentration of $CH_4$. For the simulated measurements, a correction function was established successively based on:
- the ageing function $f$, which was obtained after experimental measurements carried out while monitoring the ageing of a test light source, such as described with reference to Table 2;
- the ageing function g, which was obtained after experimental measurements carried out with modification of the operating temperature of a test light source, such as described with reference to Table 3; and
- the ageing function h, which was obtained using a theoretical expression of the luminance of the source at various wavelengths, of a test light source, such as described with reference to Table 1.

In each case, an error was estimated, in terms of ppm of $CH_4$, without using a correction function, and using correction functions based on the functions $f$, g and h, respectively. The error was determined by placing a gas-analyzing device in ambient air, in which the concentration of $CH_4$ was zero. On the basis of measurements of $I_{ref}$ and of $I_{mes}$, a $CH_4$ concentration was obtained using expression (1).

Table 4 shows, as a function of the measurement time k, the obtained errors. In Table 4, each measurement time corresponds to one pulse of the light source. It will be recalled that the time between two successive pulses was 500 ms.

TABLE 4

| k | absence of correction | correction using f | correction using g | correction using h |
|---|---|---|---|---|
| 0 | 0 | 0 | 0 | 0 |
| 2073600 | 7592 | 1472 | 2162 | 899 |
| 4147200 | 10411 | 1334 | 2304 | 556 |
| 6220800 | 14943 | 1630 | 2984 | 564 |
| 9676800 | 22597 | 681 | 2601 | −646 |
| 11750400 | 27564 | 1161 | 3424 | −364 |
| 17971200 | 36398 | 282 | 2936 | −1767 |

Compared to the absence of correction, use of a correction function, irrespectively of which one, allows the measurement error to be significantly limited.

Correction based on the ageing function $f$ is the best. This is a logical result, since the ageing function $f$ was obtained after monitoring the actual ageing process of the light source. However, it will be noted that the errors obtained when the ageing functions g and h are used are acceptable. Thus, use of such ageing functions seems to be a promising way of correcting for the differential ageing of the light source. Specifically, the ageing functions g and h may be obtained quickly, and do not require the entire ageing process of a light source to be monitored. They form a particularly advantageous compromise between measurement error and the ease of obtainment of the correction function.

According to one variant, in step 130, the value I(k) of the intensity measured by the measurement sensor, at the measurement time, is corrected, by taking into account the correction function $\delta$, depending on the reference intensity measured at the measurement time.

This results in a corrected intensity I*(k). The correction function $\delta$ may be expressed using the ageing function corresponding to expression (9), such that:

$$I^*(k) = \delta(I(k), I_{ref}(k)) = I(k) \times \left[1 - \frac{h(EL_{ref}(k, \lambda_{mes}))}{100}\right] \quad \text{Expression (20)}$$

with $$EL_{ref}(k) = \frac{I_{ref}(k=0) - I_{ref}(k)}{I_{ref}(k=0)} \times 100 \quad \text{Expression (21)}$$

I*(k) corresponds to a value that would be measured, by the measurement photodetector, in the absence of ageing of the light source.

It will be understood that in expression (20), the function g may be used instead of the function h.

According to this variant, in step 140, the absorption is obtained using the expression:

$$abs(k) = 1 - \frac{I^*(k)}{I_0(k=0)} \quad \text{Expression (22)}$$

$I_0(k=0)$ corresponds to an intensity value that would be measured, by the measurement photodetector, in the absence of ageing of the light source, and in the absence of gas between the light source and the measurement photodetector.

The disclosure will possibly be employed to detect an amount of gas species $G_x$ having absorption wavelengths comprised in the measurement spectral band $\Delta_{mes}$. The latter may be narrow, as in the experimental example described above. It may also be wide, so as to include, for example, the absorption spectral bands $\Delta_x$ of a plurality of different gas species.

The invention claimed is:

1. A method for measuring an amount of a gas species present in a gas, the gas absorbing light in an absorption spectral band, the method comprising:
   a) placing the gas between a light source and a measurement photodetector, the light source being configured to emit an incident light wave, the incident light wave propagating through the gas to the measurement photodetector, the light source being passed through by an electrical supply current, so as to bring the light source to a temperature value;

b) illuminating the gas with the light source;

c) measuring, with the measurement photodetector, a measurement intensity of a light wave transmitted by the gas, in a measurement spectral band comprising the absorption spectral band; and d) measuring, with a reference photodetector, a reference intensity of a reference light wave, the reference light wave being emitted by the light source in a reference spectral band;

wherein b), c) and d) are implemented at a plurality of measurement times;

the method further comprising, at each measurement time:

e) on the basis of the reference intensity measured by the reference photodetector, taking into account a correction function representative of a variation in an intensity of the incident light wave in the measurement spectral band relatively to an intensity of the incident light wave in the reference spectral band; and f) estimating an amount of the gas species, on the basis of the measurement intensity measured in c), of the reference intensity measured in d), and of the correction function taken into account in e);

wherein:

the correction function is established beforehand in a calibrating phase, by comparing, at various temperature levels, or at various supply-current levels, the light intensities emitted, by a test light source, in the measurement spectral band and in the reference spectral band, respectively, the test light source being considered to be representative of the light source employed in b), at each measurement time; and during the calibrating phase, use is made of a calibration gas, the calibration gas comprising a concentration of the gas species, the concentration being constant or considered to be zero.

2. The method of claim 1, wherein the calibrating phase is carried out experimentally, the calibrating phase comprising:

placing the test light source facing a test measurement photodetector and facing a test reference photodetector, the test measurement photodetector and the test reference photodetector being representative of the measurement photodetector and of the reference photodetector, respectively;

illuminating the test measurement photodetector and the test reference photodetector with the test light source, the test light source being successively brought to various temperature values by various supply currents; and at each temperature value, comparing a light intensity detected by the test measurement photodetector, in the measurement spectral band, with a light intensity detected by the test reference photodetector, in the reference spectral band, the correction function being established on the basis of the comparisons made at each temperature value.

3. The method of claim 2, wherein the calibrating phase further comprises determining an ageing function, relating ageing of the test light source, in the reference spectral band, to ageing of the test light source, in the measurement spectral band, the method being such that the correction function is determined on the basis of the ageing function.

4. The method of claim 3, wherein the test light source is none other than the light source used in b), at each measurement time.

5. The method of claim 1, wherein:

e) comprises, on the basis of the correction function and of the intensity measured by the reference photodetector in d), estimating an intensity that would be detected, by the measurement photodetector, in the absence of gas; and in f), the amount of gas species is determined on the basis of a comparison between the intensity measured by the measurement photodetector, in c), and the intensity estimated in e).

6. The method of claim 1, wherein:

e) comprises, on the basis of the correction function and of the intensity measured by the reference photodetector in d), determining a corrected intensity, the corrected intensity corresponding to an intensity that would be detected, by the measurement photodetector, in the absence of ageing of the light source; and in f), the amount of gas species is determined on the basis of a comparison between the corrected intensity resulting from e) and an estimate of an intensity that would be detected by the measurement photodetector, in the absence of gas between the light source and the measurement photodetector, and in the absence of ageing of the light source.

7. The method of claim 1, wherein e) comprises estimating an ageing of the light source, in the reference spectral band, on the basis of the reference intensity measured at the measurement time, and of the reference intensity measured at an initial time.

8. The method of claim 7, wherein the ageing of the light source, in the reference spectral band, is computed on the basis of a comparison between the reference intensity measured at the measurement time, and the reference intensity measured at the initial time.

9. The method of claim 1, wherein, during the calibrating phase, the concentration of the gas species in the calibration gas is considered to be zero.

10. A device for determining an amount of a gas species in a gas, the device comprising:

a light source configured to emit an incident light wave that propagates to the gas, the incident light wave lying in an absorption spectral band of the gas species;

a measurement photodetector, configured to detect a light wave transmitted by the gas, at various measurement times, in a measurement spectral band, and to measure a measurement intensity thereof;

a reference photodetector, configured to measure a reference intensity of a reference light wave emitted by the light source, in a reference spectral band, at the various measurement times; and a processor, programmed to implement actions, on the basis of the reference intensity and of the measurement intensity, the actions comprising, at each of the various measurement times:

on the basis of the reference intensity measured by the reference photodetector, taking into account a correction function representative of a variation in an intensity of the incident light wave in the measurement spectral band relatively to an intensity of the incident light wave in the reference spectral band; and estimating an amount of the gas species, on the basis of:
the measurement intensity measured by measuring, with the measurement photodetector, the measurement intensity of the light wave transmitted by the gas, in the measurement spectral band comprising the absorption spectral band, the reference intensity measured by measuring, with the reference photodetector, the reference intensity of the reference light wave, the reference light wave being emitted by the light source in the reference spectral band, and the correction function taken into account when taking into account the correction function representative of the variation in the intensity of the incident light wave in the measurement spectral band relatively to the intensity of the incident light wave in the reference spectral band;

wherein:

the correction function is established beforehand in a calibrating phase, by comparing, at various temperature levels, or at various supply-current levels, the light intensities emitted, by a test light source, in the measurement spectral band and in the reference spectral band, respectively, the test light source being considered to be representative of the light source used in emitting the incident light wave that propagates to the gas, at each measurement time; and during the calibrating phase, use is made of a calibration gas, the calibration gas comprising a concentration of the gas species, the concentration being constant or considered to be zero.

11. The device of claim 10, wherein the processor is configured to implement the correction function established in the calibrating phase, by comparing, at the various temperature levels, or at the various supply-current levels, the light intensities emitted, by the test light source, in the measurement spectral band and in the reference spectral band, respectively, the test light source being considered to be representative of the light source used in emitting the incident light wave that propagates to the gas, at each measurement time.

12. A method for measuring an amount of a gas species present in a gas, the gas absorbing light in an absorption spectral band, the method comprising:

a) placing the gas between a light source and a measurement photodetector, the light source being configured to emit an incident light wave, the incident light wave propagating through the gas to the measurement photodetector, the light source being passed through by an electrical supply current, so as to bring the light source to a temperature value;

b) illuminating the gas with the light source;

c) measuring, with the measurement photodetector, a measurement intensity of a light wave transmitted by the gas, in a measurement spectral band comprising the absorption spectral band; and d) measuring, with a reference photodetector, a reference intensity of a reference light wave, the reference light wave being emitted by the light source in a reference spectral band;

wherein b), c) and d) are implemented at a plurality of measurement times;

the method further comprising, at each measurement time:

e) on the basis of the reference intensity measured by the reference photodetector, taking into account a correction function representative of a variation in an intensity of the incident light wave in the measurement spectral band relatively to an intensity of the incident light wave in the reference spectral band; and f) estimating an amount of the gas species, on the basis of the measurement intensity measured in c), of the reference intensity measured in d), and of the correction function taken into account in e);

wherein:

the correction function is established beforehand in a calibrating phase, by comparing, at various temperature levels, or at various supply-current levels, the light intensities emitted, by a test light source, in the measurement spectral band and in the reference spectral band, respectively, the test light source being considered to be representative of the light source employed in b), at each measurement time;

the calibrating phase is carried out using a theoretical expression that defines an emission intensity of the test light source as a function of the temperature of the test light source and of wavelength, the calibrating phase being carried out considering a wavelength in the measurement spectral band and a wavelength in the reference spectral band, respectively; and the calibrating phase comprises determining an ageing function, relating an ageing of the test light source, in the reference spectral band, to an ageing of the light source, in the measurement spectral band, the method being such that the correction function is determined on the basis of the ageing function.

13. The method of claim 12, wherein the test light source is none other than the light source used in b), at each measurement time.

* * * * *